United States Patent Office 3,441,284
Patented Apr. 29, 1969

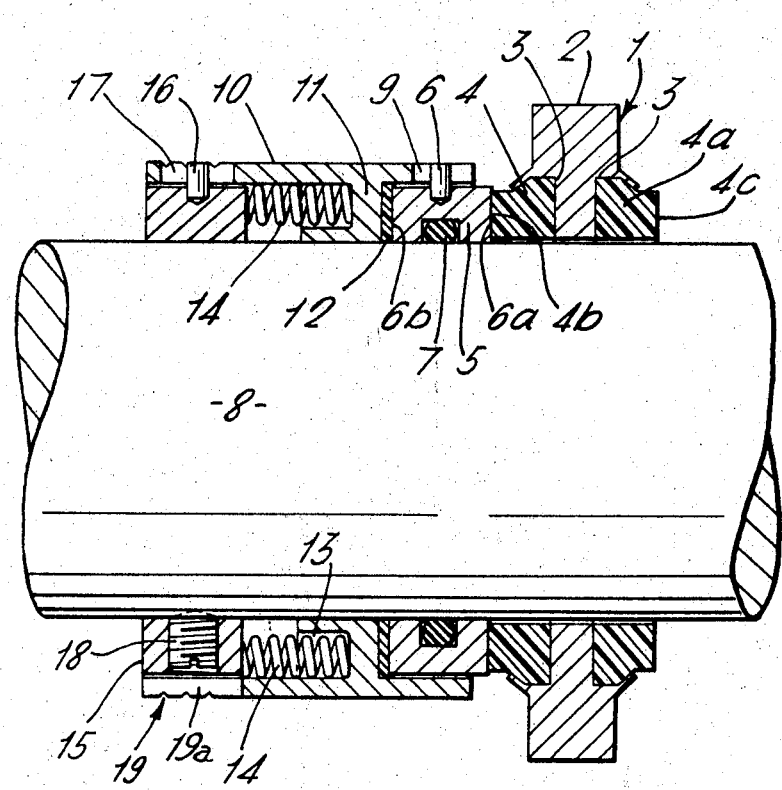

3,441,284
REVERSIBLE MECHANICAL SEAL
William Murray, Lillington, Leamington Spa, and Gordon Richard Walker, Southam, England, asisgnors to Filton Limited, Leamington Spa, England
Filed June 17, 1966, Ser. No. 558,390
Int. Cl. F16j 15/34
U.S. Cl. 277—9                    3 Claims

ABSTRACT OF THE DISCLOSURE

A mechanical seal including a rubbing ring and a rotable seat ring in which each of the co-operating rings has a pair of sealing faces and is adapted to be reversibly mounted.

---

The present invention relates to shaft and like mechanical seals of the type in which two faces of a high degree of flatness rotate relatively in contact with one another to form a fluid-tight seal. It is well known for example to employ a ring made of carbon, plastics, metal or other suitable material to provide one face, e.g., the fixed face, and a ring of a different material, such as a stainless steel or nitralloy ring, or a ring surfaced with a different material, e.g., having hard-chromed surface, providing the co-operating rotating face, the co-operating faces being finished optically flat.

Generally one ring will be secured to a fixed or slowly rotating part and the other will be carried by the rotating or more rapidly rotating part, such as the shaft, of the apparatus to be sealed and we will hereinafter refer to the first ring as the seat ring and the second ring as the rubbing ring.

As a result of wear, these accurate co-operating faces are liable to deteriorate and it may on occasion be beneficial to be able to bring different finished flat faces into sealing co-operation in one and the same seal without necessarily completely replacing a component or components of the seal.

To this end the present invention provides a seal of the type referred to in which either the rubbing ring and/or the co-operating seat ring is provided with two sealing faces and one or each of the said co-operating rings is axially reversible so that a sealing face which has been previously not in use may now become effective.

The seat ring may comprise a carrier ring and two co-axial seal rings mounted in annular recesses in the sides of the carrier ring so as to project axially beyond each side of the carried ring and each provide a radial outer end face which is finished to provide a seal face.

The rubbing ring, e.g., of stainless steel or nitralloy, or a ring with a hard-chromed face, may be mounted co-axially with the aforesaid seat ring and formed in one piece with each radial end face finished to provide a seal face. This ring may be internally annularly grooved to accommodate an O-ring or like resilient ring whereby the said rubbing ring may be sealed to the shaft and coupled for rotation therewith.

The carrier ring of the seat ring may be fixed, e.g., clamped within a suitable part of the apparatus to be sealed, and the co-operating rubbing ring may be coupled, e.g., by radial pin and axial slot means to rotate with a housing, preferably a cylindrical housing. The rubbing ring may be located in one end of the housing which contains in its other end a ring that can be axially adjusted relatively to the housing and fixed to the shaft at a desired position of adjustment. Between this adjustable ring and a radial wall extending inwardly of the housing, spring means may be interposed whereby one face of the rubbing ring may be forced into sealing engagement with the sealing face of one of the said seal rings of the seat ring. The adjustable ring may be secured to the shaft in adjusted position by a radial grub screw or screws and pin and slot torque connections may be provided between the adjustable ring and the housing and a scale may be provided for determining the extent of adjustment. Pins on the adjustable ring (applied after assembly) may operate in closed-end slots so that the housing and the ring are retained against separation. A resilient washer may be interposed between the said wall and the rotating ring.

The housing may be formed in the radially inwardly extending wall with a number of pockets parallel to the axis of the shaft for accommodating separate helical compression springs, which remain trapped within the housing by the aforesaid inseparability of the housing and adjustable ring.

In order that the invention may be more clearly understood, reference is hereinafter made to one embodiment of mechanical seal incorporating the features of the invention, illustrated in the accompanying drawing.

The seat ring 1 comprises a carrier ring 2, which can be suitably secured e.g. clamped, within the casing of the apparatus (a pump for example). The sides of this ring are annularly recessed at 3 to accommodate fixed seal rings 4, 4a which project from the recesses and the outer end faces 4b, 4c of which are finished optically flat to provide radial seal faces. The carrier ring 2 may be of stainless steel and the seal rings 4, 4a of glass-filled P.T.F.E. The rings 4, 4a may be peened in position.

Either one of the seal rings 4, 4a, may be in use at any one time, i.e. in the drawing, the ring 4 with seal face 4b is effective.

The co-operating one-piece rubbing ring 5 carries radial pins 6 projecting from its outer periphery and both end faces of this ring 5 are finished optically flat to provide seal faces 6a, 6b. The ring 5 is provided with an internal annular groove accommodating an O-ring 7 by which ring 5 is sealed with the shaft 8. Radial pins 6 project into longitudinal open-ended slots 9 in a cylindrical housing 10 having an inwardly extending radial wall 11 which is separated from the rubbing ring 5 by means of a resilient washer 12. The radial wall aforesaid is formed with pockets 13 arranged parallel to the axis of the shaft at suitable and preferably equal spaced positions around one side of the wall 11, and helical compression springs 14 are arranged to extend into these pockets. An adjusting ring 15 is provided in the outer end of the cylindrical housing. The ring 15 is provided with radial pins 16 projecting from its outer periphery into closed-ended longitudinal slots 17 in the housing. The pins may be fixed to the adjusting ring through the slots after assembly. The adjusting ring is displaceable axially to compress the springs to a desired degree and it can be fixed to the shaft in the desired adjusted position by means of a grub screw 18 which may bite into the shaft as shown.

Accurate adjustment of the adjusting ring may be assisted by providing the housing with a series of minute annular scale grooves 19, using the pins 16 as indicators.

The pressure with which the effective face 6a of the rotating ring engages the co-operating face 4b of the seat ring can be determined by suitable adjustment of the adjustable ring and the degree of compression of the aforesaid springs. Rotation of the shaft is transmitted to the rubbing ring 5, and torque is transmitted from the said ring to the housing by way of the radial pins 6 and 16 engaging the slots 9 and 17. The adjusting ring is securely coupled for rotation with the shaft by the grub screws. Normally one end face of the rubbing ring 5 and the outer end face of one of the seal rings 4, 4a will be inoperative. When such wear has taken place as to make it desirable to bring two new seal faces into co-operation, the seat ring may be axially reversed. The grub screws are accessible through slot 19a and can be released, the housing retracted from the rubbing ring 5 and this axially reversed so that the seal face hitherto out of use can now be brought into effect. Reversal of the rubbing ring can be effected without detaching the adjustable ring from the housing or freeing the springs, i.e., the housing, adjustable ring and springs remain as an assembled unit. This feature of the invention is advantageous even without the feature of reversibility before-mentioned.

What is claimed is:

1. A mechanical seal comprising a shaft, a rubbing ring and a seat ring mounted on said shaft to be relatively rotatable with each other and in facial sealing contact with each other to form a fluid-tight seal, each of the said co-operating rings being provided with two faces, each face adapted to form a sealing face, two of said faces, one of each ring, being operative while the other faces are remote from one another and out of use, the said rings each being reversibly mounted so that said rings can be reversed and remounted in co-operative operation and the respective remote sealing faces can be brought into sealing engagement with each other.

2. A mechanical seal according to claim 1, in which the seat ring comprises a fixing carrier ring with opposed co-axial annular recesses and having a seal ring arranged in each of the said recesses so as to project axially beyond the corresponding face of the carrier ring, the outer faces of said seal rings forming two reversible sealing faces and in which the rubbing ring is formed in one piece with each end face finished to provide a seal face.

3. A mechanical seal according to claim 1 comprising a housing in one end of which the rubbing ring is arranged, an adjustable ring mounted in the other end of the said housing, means for fixing the said adjustable ring to the shaft in adjusted position, pin and slot means coupling said adjustable ring to said housing; said housing comprising a radial wall, said rubbing ring being accommodated on one side of the said wall within the housing; spring means interposed between the other side of the said wall and the said adjustable ring, the rubbing ring being coupled by pin and slot means to rotate with the housing, and a resilient washer maintaining the out-of-use face of the said rubbing ring away from the said wall.

References Cited

UNITED STATES PATENTS

| | | | |
|---|---|---|---|
| 2,584,679 | 2/1952 | Dobrosavljevic | 277—9 |
| 2,628,852 | 2/1953 | Voytech | 277—81 X |

FOREIGN PATENTS

| | | |
|---|---|---|
| 993,820 | 6/1965 | Great Britain. |

OTHER REFERENCES

Packing and Mechanical Seals, by G. W. Schmidt, The Crane Packing Co. (pp. 92 and 93, FIG. 4), Aug. 12, 1959 (copy in Group 360).

SAMUEL ROTHBERG, *Primary Examiner.*

U.S. Cl. X.R.

277—32